PARALLEL COMPUTER SYSTEM CONTROL

Filed Aug. 5, 1963 6 Sheets-Sheet 1

WITNESSES

INVENTORS
Walter C. Borck, Jr
and David K. Sloper
BY
ATTORNEY

PARALLEL COMPUTER SYSTEM CONTROL

Filed Aug. 5, 1963 6 Sheets-Sheet 2

March 7, 1967 W. C. BORCK, JR., ET AL 3,308,436
PARALLEL COMPUTER SYSTEM CONTROL
Filed Aug. 5, 1963 6 Sheets-Sheet 3
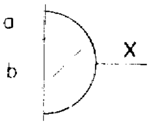
Fig. 4.
| a | b | X |
|---|---|---|
| 1 | 0 | 1 |
| 0 | 1 | 1 |
| 0 | 0 | 1 |
| 1 | 1 | 0 |
Fig. 4A.
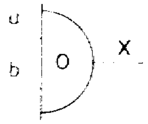
Fig. 5.
| a | b | X |
|---|---|---|
| 1 | 0 | 1 |
| 0 | 1 | 1 |
| 1 | 1 | 1 |
| 0 | 0 | 0 |
Fig. 5A.
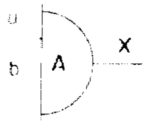
Fig. 6.
| a | b | X |
|---|---|---|
| 1 | 0 | 0 |
| 0 | 1 | 0 |
| 0 | 0 | 0 |
| 1 | 1 | 1 |
Fig. 6A.
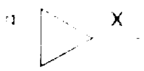
Fig. 7.
| a | X |
|---|---|
| 1 | 0 |
| 0 | 1 |
Fig. 7A.
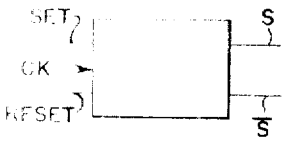
Fig. 8.
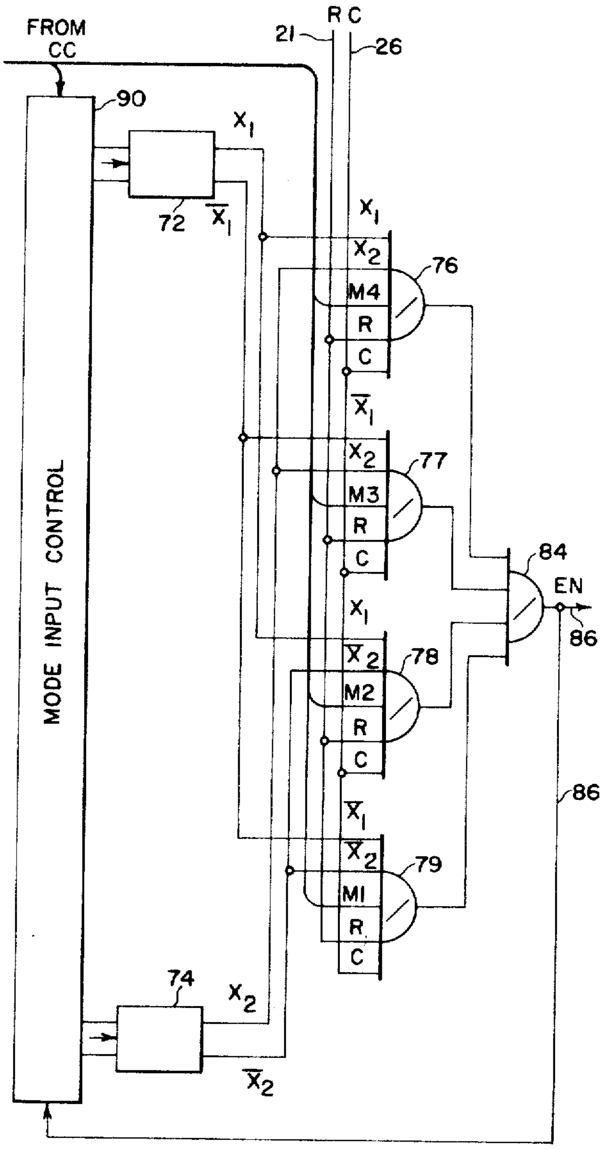
Fig. 9.

PARALLEL COMPUTER SYSTEM CONTROL

Filed Aug. 5, 1963 6 Sheets-Sheet 5

United States Patent Office 3,308,436

Patented Mar. 7, 1967

3,308,436

PARALLEL COMPUTER SYSTEM CONTROL

Walter C. Borck, Jr., Baltimore, and David K. Sloper, Severna Park, Md., assignors to Westinghouse Electric Corporation, Pittsburgh, Pa., a corporation of Pennsylvania Filed Aug. 5, 1963, Ser. No. 299,956
15 Claims. (Cl. 340—172.5)

This invention in general relates to electronic computers, and more particularly to parallel network type computers with means for facilitating certain operations performed by such computers.

Many mathematical problems are best adapted to be solved by a parallel type of computation, and to this end there has been proposed parallel network type computers wherein a central control unit will simultaneously control a plurality of individual and similar processing elements. The processing elements are generally arranged in a matrix type of an array and possess the capability of communicating, that is transferring information to other preselected processing elements of the array, such as its nearest neighbor processing elements. A central control means decodes instructions generally stored in a central program memory and provides a plurality of control signals which are fed to each of the processing elements of the array such that each will carry out the operation as specified by the control signals, on information stored within memory means associated with each processing element. These processing elements are then capable of executing, simultaneously, all logical and mathematical operations upon information or operands, stored within themselves, or within a neighboring processing element. Means may additionally be provided to place preselected processing elements into different modes of operation, depending upon predetermined conditions internal to the processing element, such that the processing elements may alter control signals from the central control means and will carry out designated instructions only if the certain predetermined conditions are met. To increase the number of modes of operation, it is necessary to increase the circuitry of each individual processing element of the array. This represents an increase in the cost of the overall computer since there may be over one thousand processing elements in the array.

In order to load information into the memory means associated with each processing element, there is generally provided input and output means which may load the information into the processing elements along an edge of the matrix array and which information is then shifted across the matrix array until desired data are loaded into the individual memory means. For certain operations it would be more desirable to load individual processing elements, or groups of processing elements directly, rather than having information shifted across the matrix array. This is also true when an outputting of information from the processing elements is required.

It is therefore one object of the present invention to provide control means for a parallel network type computer which permits greater speeds of inputting and outputting information.

It is a further object to provide control means for a parallel network type computer having a plurality of processing elements which permits inputting or outputting of information directly to any processing element of the array.

It is another object to provide control means for a parallel network computer having a plurality of processing elements which permits the transfer of information between various groups of processing elements.

It is another object of the present invention to provide control means for a parallel network type computer having a plurality of processing elements capable of operation in a plurality of modes, which control means will effectively allow additional modes of operation.

It is yet another object to provide control means for a parallel network type computer which results in a more flexible system than heretofore.

It is another object to provide control means for a parallel network type of computer having a plurality of processing elements, which control will allow different subsets of processing elements to process different problems.

It is another object to effectively increase the size of the memory means associated with the computer.

It is still another object to provide a control means for a parallel network type of computer which will allow greater speeds of operation than heretofore.

Briefly, in accordance with the above objects, the broad concept of the present invention comprises means associated with the processing elements of a parallel network type computer, which means, is operable to provide a plurality of selection signals to preselected processing elements. Decoding means associated with each processing element may then be made responsive to a selection signal or signals for providing an enabling signal. The decoding means may be operable to provide the enabling signal with just a first and second selection signals present, or by various combinations of control signals supplied by a central control means and the selection signals. Once provided, the enabling signal is utilized to modify the operation of the processing element and the utilization of the enabling signal in various input and output operations allows the computer to operate at faster speeds. In one embodiment there is provided buffer means which include a plurality of storage devices such as flip-flops. A plurality of communicating means are provided to accept data from various groups of processing elements for transferring data to the plurality of storage devices. The information contained in the storage devices may then be transferred to other groups of processing elements of the computer and which operations are governed in part by the enabling signal. The buffer means are connected to input-output equipment to thereby allow a transfer of information to and from sources external to the computer system.

The above stated and further objects of the present invention will become apparent upon reading the following detailed specification taken in conjunction with the drawings, in which:

FIGS. 4, 5, 6, 7 and 8 are diagrammatic representations of logic elements which may be used in the present invention;

FIGS. 4A, 5A, 6A and 7 are truth tables illustrating the operation of the logic elements of FIGS. 4, 5, 6 and 7;

FIG. 9 is a schematic electrical diagram illustrating a portion of the processing element of FIG. 3 in more detail;

Figure 1:
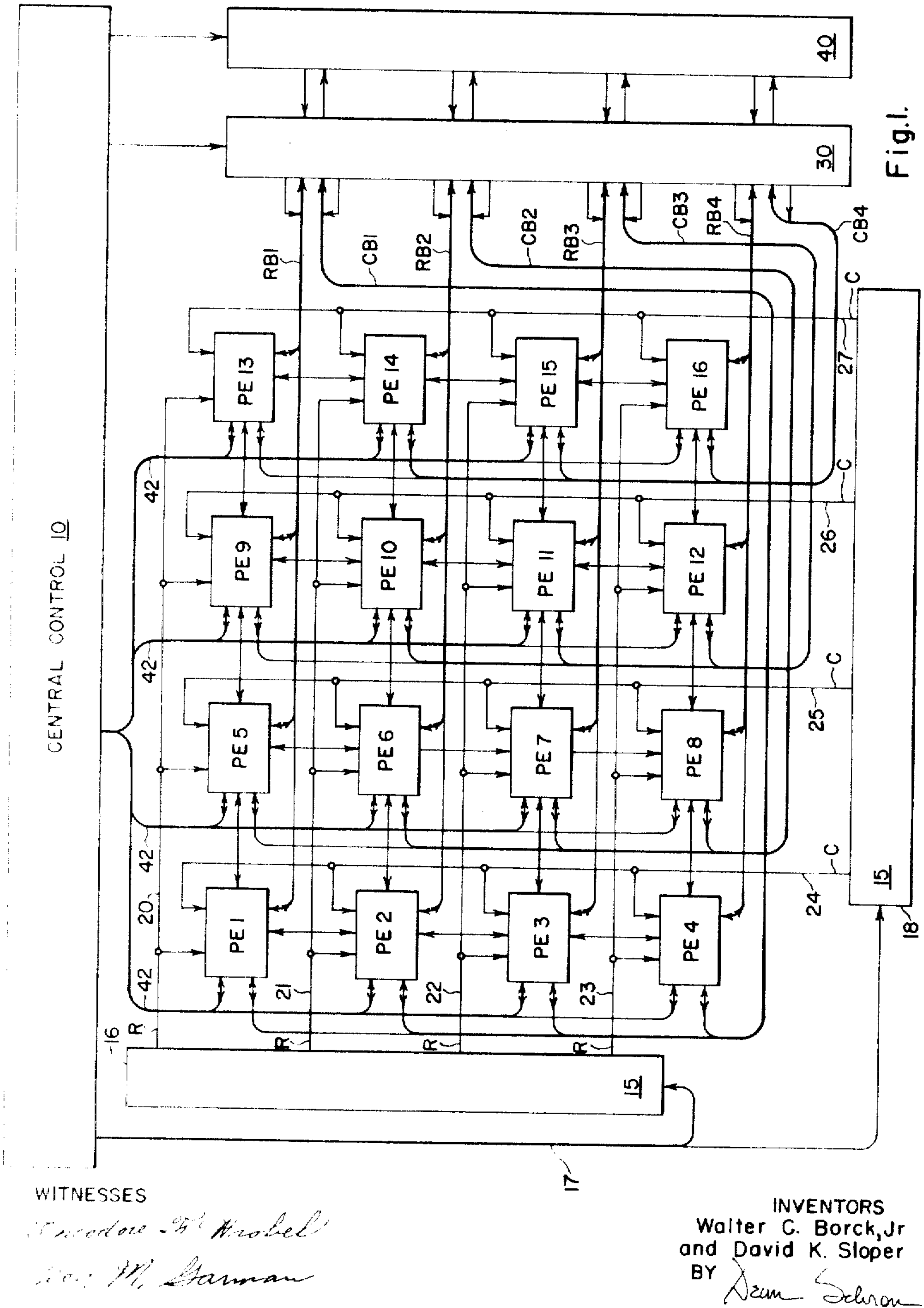
FIGURE 1 is a block diagram illustrating a basic array of processing elements under simultaneous control of a central control unit and incorporating the present invention.

Referring now to FIGURE 1, there is shown a typical array of processing elements, with the processing elements labeled PE1 to PE16. Although the square array shown comprises sixteen processing elements, more or fewer processing elements may be utilized in other predetermined arrays. The array shown in FIG. 1 is generally termed an $n \times m$ array where $n=m$. Each processing element has the ability to communicate with predetermined other processing elements in the array and by way of example, FIGURE 1 shows each processing element communicating with its nearest neighbors. In the computer described herein each processing element is under simultaneous control of a central control unit 10. Basically, the central control unit 10 contains a central program memory, has means to retrieve and interpret stored instructions, and includes the circuitry and capability to cause execution of thees instructions which the processing element array. One such computer is more fully described and claimed in a copending application by Daniel L. Slotnick, Serial No. 242,234, filed December 4, 1962 and assigned to the assignee of the present invention. The present invention finds use with such a system described, and is shown in FIGURE 1 as the external control means 15 including in one embodiment, a first signal providing means 16 and a second signal providing means 18. The first signal providing means 16 is operable to supply a plurality of first selection signals to the processing elements of the array and it is seen that line 20 supplies a first selection signal R to processing elements 1, 5, 9 and 13; line 21 is operable to supply an R signal to processing elements 2, 6, 10 and 14; line 22 supplies an R signal to processing elements 3, 7, 11 and 15; and line 23 is operable to supply an R signal to processing elements 4, 8, 12 and 16. In a similar manner the second signal providing means 18 is operable to supply a plurality of second selection signals to the array of processing elements and it is seen that line 24 supplies a second selection signal C to processing elements 1, 2, 3 and 4; line 25 is operable to supply a C signal to processing elements 5, 6, 7 and 8; line 26 is operable to supply a C signal to processing elements 9, 10, 11 and 12; and line 27 is operable to supply a C signal to processing elements 13, 14, 15 and 16.

The external control means 15 may comprise a plurality of flip-flop devices for providing either a ONE or a ZERO signal on the lines 20 to 27 in accordance with desired operations as will become apparent hereinafter. The flip-flop devices may be set or reset in accordance with external setting means, or as indicated in FIGURE 1 by the central control means via a bus 17 which may carry setting or resetting signals provided by an instruction. Other embodiments of the external control means 15 include various decoding means, gating devices or the like.

In order to transfer data from the processing elements to suitable input-output means 40 there is provided an intermediate buffer means 30 for accepting data from various processing elements of the array. The medium for transferring this data may be a plurality of communicating means operable to connect a plurality of groups of processing elements with the buffer means 30. To this end, in FIGURE 1, row bus RB1 is seen to communicate with the processing elements of the first row, and in a similar manner row bus RB2 communicates with the processing elements of the second row, row bus RB3 communicates with the processing elements of the third row, and row bus RB4, communicates with the processing elements of the fourth row. As will become apparent hereinafter, any selected processing element in the particular rows may have information transferred to and from the row buses connected with the buffer means 30, and by way of example if the first processing element in each row is selected, that is PE1, 2, 3 and 4, the first column of processing elements may transmit or receive information along the row buses RB1, RB2, RB3 and RB4. In a similar manner, columns 2, 3 or 4 may be selected to perform this operation.

To transfer information to and from a selected processing element in a column, there is provided a plurality of column buses with column bus CB1, communicating with processing elements 1, 2, 3 and 4; column bus CB2, communicating with the processing elements of the second column, that is, processing elements 5, 6, 7 and 8; column bus CB3, in a similar manner communicates with the processing elements 9, 10, 11 and 12 of the third column and column bus CB4, communicates with the processing elements of the fourth column. The communicating means therefore serves as the medium for transferring information in selected rows, or selected columns, to the buffer means 30. With this capability, the information in an individual processing element, or different groups of processing elements, may have direct communication with the buffer 30. These data transfer operations are controlled in part by the external control means 15 which may be caused to provide preselected first and second selection signals in accordance with an instruction from the central control means 10 via lines in bus 17.

The central control means 10 instructs the operation of the processing element array by means of control signals fed along lines in bus 42 such that each processing element of the array receives the same signal, or signals, from the central control means 10. In order to clearly show the various connections made to a processing element reference should now be made to FIG. 2.

Figure 2:
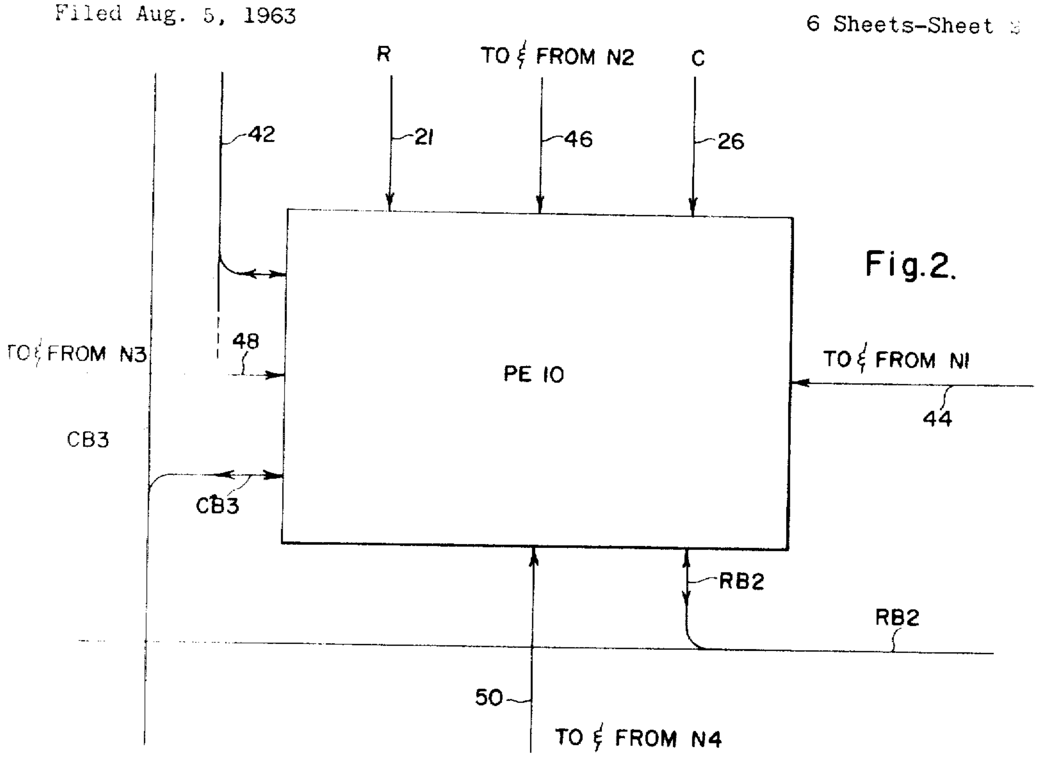
FIG. 2 illustrates an enlarged view of one of the processing elements of FIG. 1.

FIGURE 2 shows an enlarged portion of FIGURE 1 illustrating various buses and lines communicating with a typical processing element, such as processing element 10 (PE10). Processing element 10 is operable as will hereinafter be described to transfer and receive data by means of communication with the row bus RB2 and the column bus CB3. The processing element 10 receives various control signals by means of lines in bus 42 in addition to receiving an R signal from the first signal providing means 16 along line 21 and a C signal from the second signal providing means 18 along line 26. Processing element 10 may receive information from a first neighbor (N1), processing element 14, in addition to being able to transmit information to N1 along lines located in the bus 44. In a similar manner, communication may be had with neighbor (N2), processing element 9, along lines in bus 46. Communication may be had with a third neighbor (N3), processing element 6, along lines in bus 48, and communication may be had with a fourth neighbor (N4), processing element 11, along lines in bus 50. For a better understanding of how these various lines and buses communicate with a typical processing element reference should now be made to FIGURE 3.

Figure 3:
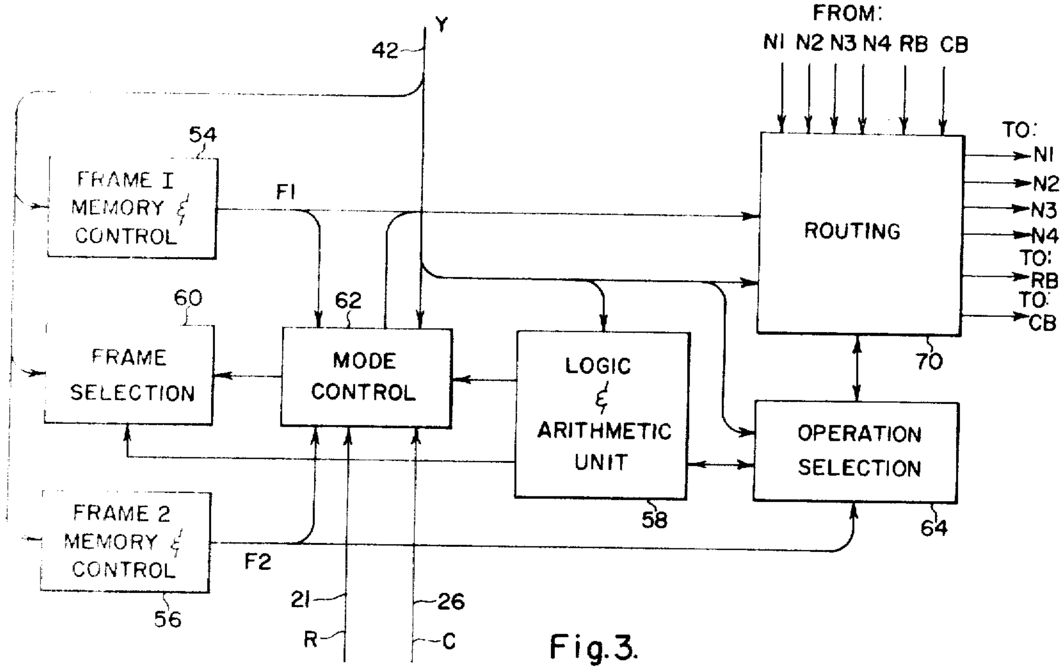
FIG. 3 is a block diagram illustrating a typical processing element.

Basically, a typical processing element includes some form of memory means for storing data, means for carrying out predetermined operations on the data, routing means for transferring the data into and out of the processing element, and in some instances, some sort of internal control means may be provided. FIGURE 3 illustrates the typical processing element PE10 incorporating these features and may be used in conjunction with the present invention. The processing element includes a first memory and control means designated as the frame 1 memory and control 54, and a second memory and control means designated as frame 2 memory and control 56. These memory frames have the ability to store a plurality of multibit words and a typical memory may have the capacity to store several thousand bits. In order to perform desired logic operations and desired arithmetic operations, there is provided a logic and arithmetic unit 58 which is capable of performing operations on information stored in the memory frames 54 and 56. The results of any logic or arithmetic operations may be selectively stored in either the frame 1 memory 54 or the frame 2 memory 56, and the frame selection means 60 is provided to perform this selective storage operation. The frame selection means 60 may be additionally operable to transfer information between the memory frames, that is information in the frame 1 memory 54 may be transferred to the frame 2 memory 56 and information in the frame 2 memory 56 may be transferred to the frame 1 memory 22.

An internal control unit 62 may be provided and includes mode control means which is responsive to control signals and conditions within the processing element to provide an internal control signal which may alter commands specified by the central control means 10. Basically, if these predetermined conditions are met, in one embodiment, the mode control means will allow the associated processing element to carry out the operations specified by the central control means 10. The operation of the mode control means in each processing element may be such that all of the processing elements of the matrix array will carry out the specific commands designated by the central control means 10 or alternatively only preselected processing elements may be designated to carry out the specific commands. One such mode control means is more fully described and claimed in a copending application by W. C. Borck, Jr., and R. C. McReynolds, Serial No. 242,233, filed December 4, 1962, and assigned to the assignee of the present invention. An operation selection means 64 may be provided to not only control the logic and arithmetic unit 58 during certain operations, but also to pass preselected bits, or their complements, involved in the operations, and which bits may be located in the frame 1 memory 54, the frame 2 memory 56, or the memory means of a neighboring processing element. As was stated, each processing element in the array is capable of communication with other preselected processing elements in the array. Routing means 70 is provided and is operable to route information from the memory means to its associated processing element or to one of four nearest neighbor processing elements upon the receipt of predetermined control signals from the central control means 10. The routing means 70 may be additionally operable to be the medium of exchange of information from the memories of the four nearest neighbor processing elements.

The external control means 15 of the present invention is operable to supply a first and second selection signal and, as shown in FIGURE 3, is provided on the lines labeled R and C and are received by the control means 62. As was stated, the present invention allows input and output operations to be made with greater speeds and to this end, the routing means 70 may be the medium of exchange of data between the processing element and the row and column buses as heretofore described. The various units shown in FIGURE 3 are supplied with control signals along lines located in bus 42 emanating from the central control means 10.

Before explaining the operation of various units of the parallel network computer, for purposes of clarity, reference should be made to FIGURES 4, 5, 6, 7 and 8 which illustrate several types of logic symbols which will be utilized herein. FIGURE 4 shows a symbol for a STROKE gate which is the common NOT-AND (NAND). Each STROKE gate of FIGURE 4 may include a plurality of inputs, of which two are shown, one being the input signal A and the other being the input signal B; an output signal is indicated as X. The operation of the STROKE gate of FIGURE 4 is summarized in the truth table of FIGURE 4A and it is seen that a ONE output signal will be provided if any of the input signals are ZEROS, and ZERO output signal will be provided only if both the A and B signals are ONES. FIGURE 5 illustrates a logic symbol for an OR gate which may include a plurality of inputs of which two are shown, one having the input signal A and the other having the input signal B with an output signal designated as X. The truth table for the operation of the OR gate of FIG. 5 is shown in FIG. 5A and it is seen that a ONE output signal will be provided if any of the input signals are ONES, and a ZERO output signal will be provided if both the A and the B signals are ZEROS. FIG. 6 illustrates a symbol for an AND gate which may include a plurality of inputs, of which two are shown, one having the input signal A and the other having the input signal B with an output signal indicated as X. The truth table for the AND gate shown in FIG. 6A shows that a ZERO output signal will be provided if any of the input signals are ZEROS, and a ONE output signal will be provided only when both A and B are ONES. FIG. 7 illustrates a symbol for a NOT gate which is simply a single input inverter. The truth table for the NOT gate in FIG. 7A shows that if the input signal A is a ONE the output signal X will be ZERO, and if the input signal A is a ZERO the output signal X will be a ONE. FIG. 8 illustrates a symbol which will be utilized herein to designate a flip-flop device. The flip-flop includes two inputs labeled set and reset, and two outputs labeled S and $\bar{S}$. The operation of the flip-flop is such that if a ONE signal appears on the set input, a ONE signal will appear on the output S and a ZERO will appear on the output $\bar{S}$. Conversely, a ONE signal appearing on the reset input will causes a ONE signal to appear on the output $\bar{S}$ and a ZERO on the output S. An additional input, CK, is indicated to show that some sort of a clock pulse is applied to the flip-flop and the presence of which will enable the flip-flop to provide the aforesaid output signals. For a better understanding of the present invention and its cooperation with a parallel network type computer, reference should now be made to FIGS. 9, 10 and 11.

In FIG. 9 there is shown one form of control means designated as the control unit 62 in FIG. 3. The basic function of the control means is to receive, in a preferred embodiment, the first and second selection signals to provide an enabling signal which may be utilized to control or modify other operations of the computer. The circuitry illustrated in FIG. 9 allows the individual processing element to be operative in a plurality of modes. Briefly, in order to indicate the mode in which the processing element is operating, there is provided coding means, the coded output signal of which is indicative of a particular mode of operation. This means takes the form of flip-flops 72 and 74; the combination of binary output signals from the flip-flops 72 and 74 thereby indicating four different modes of operation in accordance with the following table:

TABLE

| $X_1$ | $\bar{X}_1$ | $X_2$ | $\bar{X}_2$ | Mode |
|---|---|---|---|---|
| 0 | 1 | 0 | 1 | 1 |
| 1 | 0 | 0 | 1 | 2 |
| 0 | 1 | 1 | 0 | 3 |
| 1 | 0 | 1 | 0 | 4 |

In order to decode the output signals from the flip-flop 72 and 74 and compare it with mode indicating signals from the central control means 10, there is provided decoding means taking the form of STROKE gates 76, 77, 78 and 79. STROKE gate 76 receives the $X_1$ and $X_2$ signals from flip-flops 72 and 74 in addition to a mode indicating signal designated as M4. STROKE gate 77 receives the $\bar{X}_1$ signal and $X_2$ signal from flip-flop 72 and 74, in addition to a mode indicating signal designated as M3. STROKE gate 78 receives the $X_1$ and $\bar{X}_2$ signals from flip-flops 72 and 74 in addition to a mode indicating signal designated as M2, and in a similar manner STROKE gate 79 receives the $\bar{X}_1$ and $\bar{X}_2$ signals from the flip-flops 72 and 74 in addition to a mode indicating signal designated as M1. Means for controlling the flip-flops 72 and 74 are provided in the form of the mode input control 90 which causes the coding means, flip-flop 72 and 74, to provide the coded output signals in accordance with data internal to the processing element in conjunction with predetermined control signals from the central control means 10. A more detailed explanation of the entire mode control unit may be found in the aforementioned application Serial No. 242,233. The first and second selection signals from the external control means 16 and 18 of FIG. 1, may be made operable with the STROKE gate decoding means, including the STROKE gate 76, 77, 78 and 79 such that the first selection signal R may be operatively connected to each of the aforementioned STROKE gates, and the second selection signal C may be an additional input to each of the aforementioned STROKE gates. The outputs of each of the STROKE gates 76, 77, 78 and 79 are fed to a single STROKE gate designated 84 which will then provide an enabling control signal EN if certain predetermined conditions are met. Suppose by way of example that both flip-flops 72 and 74 are in their set state of operation such that the $X_1$ and $X_2$ signals are ONES. Suppose further that the M4 mode indicating signal from the central control means is provided. STROKE gate 77 receiving at least one ZERO signal in the form of the $\overline{X}_1$ signal will provide a ONE output signal, the STROKE gate 78 receiving at least one ZERO signal in the form of the $\overline{X}_2$ signal will provide a ONE output and the STROKE gate 79 will provide a ONE output signal due to the presence of the ZERO $\overline{X}_1$ or $\overline{X}_2$ signals on the input. It is seen that the STROKE gate 76 is enabled by the presence of the $X_1$ ONE signal, the $X_2$ ONE signal, the M4 ONE signal and if the first selection signal R and the second selection signals C are ONES, STROKE gate 76 will provide a ZERO output signal which causes STROKE gate 84 to provide a ONE output enabling signal. Conversely, if the M4 mode indicating signal from the central control means is not provided but rather an M1 or M2 or M3 signal is provided, the output signal from STROKE gate 76, 77, 78 and 79 will all be ONES and the ONE enabling signal will not be provided. It may be seen that if the first and second selection signals R and C are not provided, or at least one of them is a ZERO, the enabling signal EN from STROKE gate 84 will not be provided. Since at least one of four possible modes is indicated by the flip-flop 72 and 74, by addressing the decoding means with all possible mode indicating signals at least one of the STROKE gates 76, 77, 78 or 79 will be enabled and the determining factor as to whether an enabling signal will be provided, will be the presence of both the first and second selection signals R and C. FIG. 9 illustrates one embodiment of providing an enabling signal in response to first and second selection signals. It is obvious that other combinations and arrangements may be provided and by way of example, the first and second selection signals R and C may be fed to a separate gating means with the output of this gating means and an output signal resulting from the operation of the mode indicating means being ORed together such that an enabling signal will be provided by: the first and second selection signals taken alone; a signal provided by the mode indicating means; or a combination of both. Alternatively, gating means may be provided such that an enabling signal will be produced upon the reception of only one selection signal from the external control means 15, the basic function of the control means 62 being the provision of an enabling signal in response to a predetermined selection signal or combination of first and selection signals, the gating arrangements for these operations being obvious to one skilled in the art. The embodiment shown in FIG. 9 results in a parallel network type computer which is more flexible, may solve a greater variety of problems, and allows for greater speeds of operation. The enabling signal EN appearing on line 86 is fed back to the mode input control 90 and is involved in the setting of the flip-flop 72 and 74. In addition, the enabling signal may be made operable with various portions of the processing element such that the processing element may be made non-responsive to the control signals received from the central control means for carrying out certain predetermined operations. In addition, the enabling signal may be utilized to increase the speed of transfer of information between the processing elements and between input-output means and to this end reference should now be made to FIG. 10.

Figure 10:
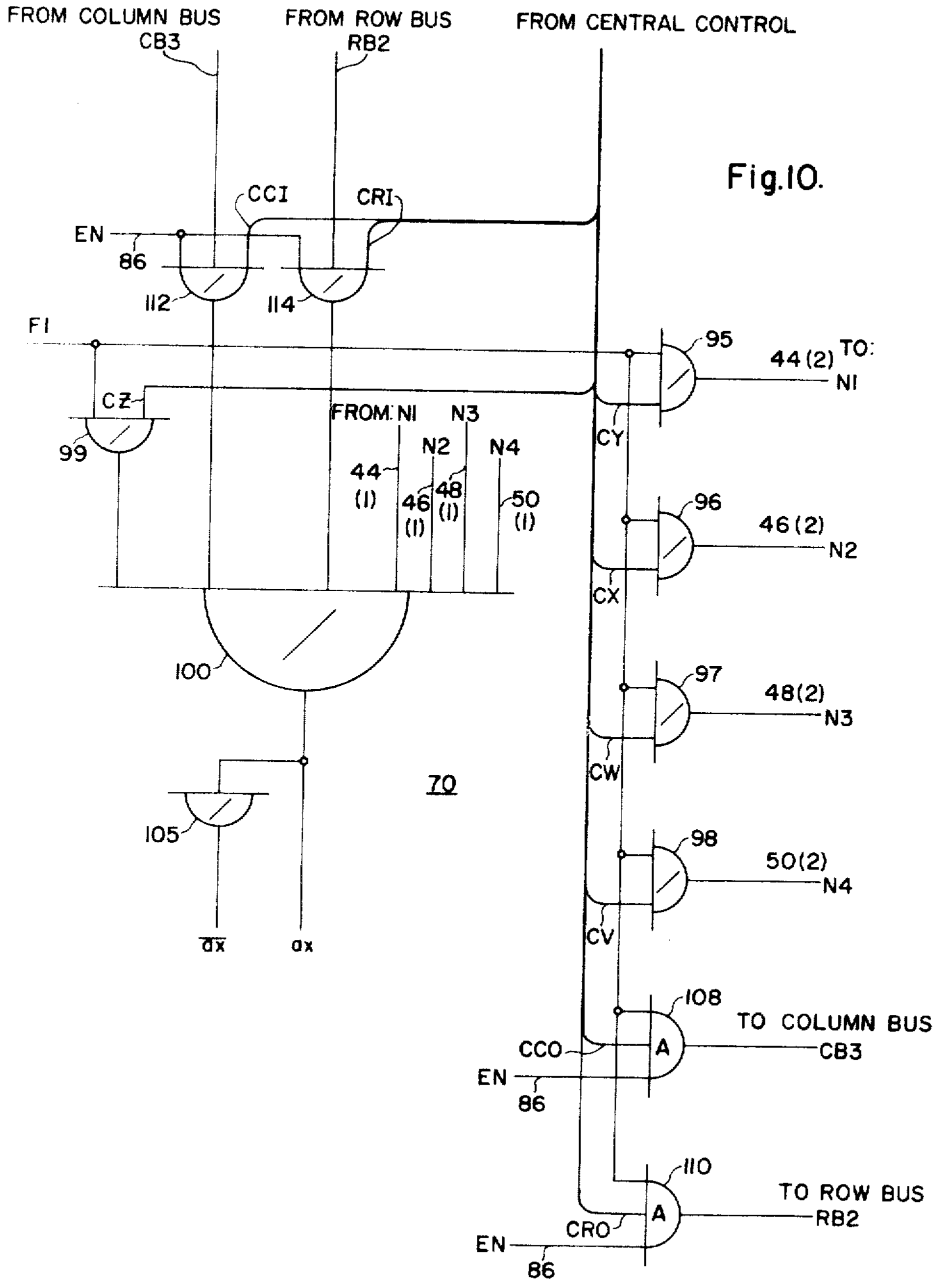
FIG. 10 is a schematic electrical diagram illustrating a portion of the processing element of FIG. 3 in more detail.

In FIG. 10 there is shown a plurality of STROKE gates 95 to 98, receiving, respectively, control signals CY, CX, CW and CV from the central control means 10. An additional STROKE gate 99 is shown and receives a CZ signal from the central control means 10. In addition, these STROKE gates receive an additional input designated F1 which represents a data bit in the processing element which may emanate, as shown in FIG. 3, from the frame 1 memory and control unit 54. These signals CV to CZ are normally ZEROS and by selectively making one of them a ONE the F1 bit may be routed to any of the neighbors N1 to N4 or may be routed internally within the associated processing element. By way of example, if CV is made a ONE, STROKE gate 98 is enabled and will pass the F1 signal to N4 (neighbor 4) via the bus 50 shown in FIG. 2, the output lead from the STROKE gate 98 being designated as 50(2) indicating a second line in the bus 50. If CW is made a ONE the STROKE gate 97 is enabled and will pass the F1 bit through to N3 along the line 48(2) indicating a second lead in bus 48 of FIG. 2. In a similar manner, the F1 signal may be selectively passed to N1 or N2. If the CZ signal to STROKE gate 99 is made a ONE, STROKE gates 95–98 will provide ONES to neighboring processing elements and the F1 signal will be passed through to a STROKE gate 100 which is enabled by virtue of the fact that the signals from N1, N2, N3 and N4 will be ONES in addition to the ONE signal from STROKE gates 112 and 114, as will hereinafter be described. STROKE gate 100 therefore will provide a signal designated *ax* which therefore represents the F1 bit read out of the frame 1 memory 54. If a routing instruction is designated for a processing element to receive information from a neighboring processing element, the STROKE gate 99 will not be enabled and will therefore provide a ONE input signal to the STROKE gate 100 and a signal will appear on one of the lines designated 44(1) from neighbor 1, 46(1) from neighbor 2, 48(1) from neighbor 3 or 50(1) from neighbor 4, indicating that these lines are one line in buses 44, 46, 48 and 50. STROKE gate 100 will therefore provide the *ax* signal which is representative of an operand bit in a neighboring processing element. In order to provide a complement signal, STROKE gate 105 is provided to receive the *ax* signal and will reproduce it in its complemented form designated $\overline{ax}$. The operand bit *ax* or $\overline{ax}$ is then utilized in a designated operation by the logic and arithmetic unit 58 (FIG. 3) after being passed through the operation selection means 64, which may also receive data bits from the frame 2 memory 56.

As was stated, the external control means 15 (FIG. 1) is operable to provide first and second selection signals which, in the embodiment of the present invention disclosed herein, will provide an enabling signal if certain predetermined conditions are met. Otherwise stated, the enabling signal EN will not be produced in the absence of both a first and second selection signal. This enabling signal may be utilized for the transfer of information, and to this end the routing means 70, shown in FIG. 10, includes a first AND gate 108 and a second AND gate 110. Each of these AND gates receives the enabling signal EN along line 86 in addition to the F1 operand bit. A signal from the central control means 10, designated CCO is fed to AND gate 108 and if this latter signal is present along with an enabling EN signal, the AND gate 108 will transfer the operand bit F1 to the column bus CB3 (recalling that typical processing element PE10 is being described) for communication with the buffer means 30 shown in FIG. 1. Alternatively, if the central control means 10 provides a CRO signal to AND gate 110, and the enabling EN signal is present, this latter gate will transfer the operand bit F1 to the row bus RB2 for communication with the buffer means 30. For receiving information from the buffer means 30 there may be provided STROKE gates 112 and 114 each capable of receiving the enabling EN signal via line 86. If information from a column bus is to be inputted to the processing element, a CCI signal to STROKE gate 112 may be provided, and if information from a row bus it to be inputted to the processing element a CRI signal from the central control means 10 may be provided to STROKE gate 114. For operations other than inputting operations these signals CCI and CRI are ZEROS which cause STROKE gates 112 and 114 to provide ONE signals to the STROKE gate 100. Since all of the processing elements receive the identical control signals from the central control means 10, only those processing elements in which an enabling EN signal has been provided will transfer information to, and receive information from the buffer means 30. It may be seen therefore that with the provision of the external control means 15 providing first and second selection signals to the array of processing elements, only preselected processing elements of the array will be responsive to inputting and outputting control signals since the absence of the enabling EN signal on AND gates 108 and 110, and STROKE gates 112 and 114 will cause a blocking of these gates. A better understanding of input and output operations may be had now by referring to FIGURE 11.

Figure 11:
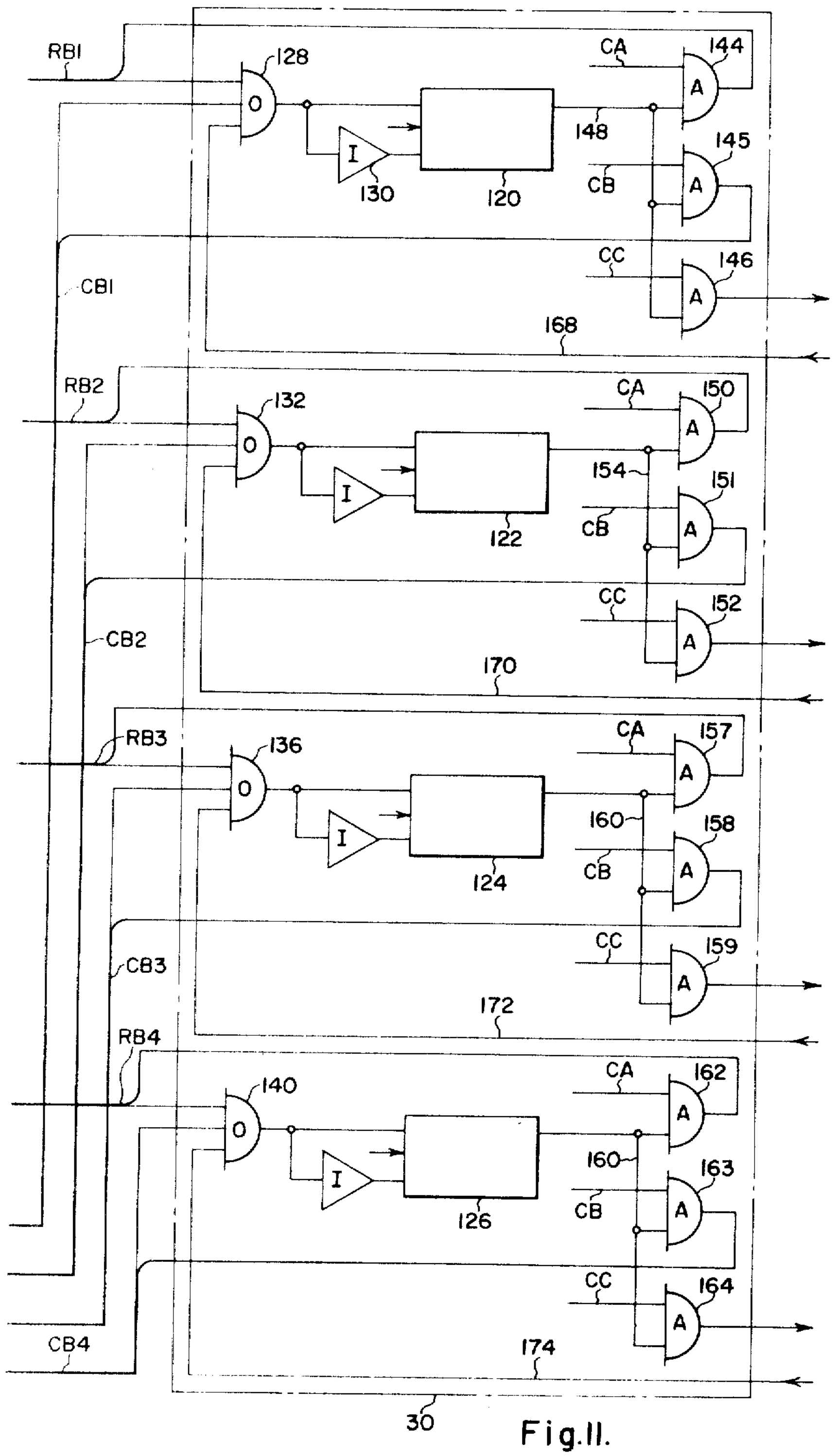
FIG. 11 illustrates in more detail one type of buffer arrangement which may be used in the present invention for input and output operations.

FIGURE 11 shows the buffer means of FIGURE 1 in more detail and may include a plurality of storage devices in the form of flip-flops 120, 122, 124, and 126. Basically the function of the buffer means is to receive information from processing elements of the array and retransmit this information to other processing elements of the array or to the input-output means 40, or alternatively, to receive information from the input-output means 40 and transmit it to selected processing elements. Associated with the flip-flop 120 is an OR gate 128 which is operable to receive information from a predetermined group of processing elements which, in the embodiment of the present invention, comprise either processing elements 1 or 5 or 9 or 13 along the communicating means, row bus RB1. In addition, OR gate 128 is operable to receive information from either processing elements 1 or 2 or 3 or 4 communicated along the column bus CB1. A third input to the OR gate 128 designated as line 168 receives information from the input-output means 40. OR gate 128 therefore is operable to reproduce a signal from a processing element in the first row if a row operation is designated, operable to receive information from a processing element in the first column, if a column operation is designated, or information from the input-output means 40 if an input operation is designated. Any output signal from the OR gate 128 is fed to one input of the flip-flop 120. In addition, the output of OR gate 128 is fed to the inverter device, NOT gate 130, such that the other input of the flip-flop 120 receives the inverted output from the OR gate 128. This NOT gate is provided such that if the output signal from the OR gate 128 is a ZERO at least one input to the flip-flop 120 will be a ONE. The output of the flip-flop 120 which is the signal reproduced from the OR gate 128, is fed to AND gates 144, 145 and 146 via the line 148 which gates additionally receive control signals CA, CB and CC respectively. The output of AND gate 144, may be fed via the row bus RB1 to a selected processing element of the first row in the processing element array and in some applications; to more than one processing element of the first row. The output of AND gate 145 may be fed via the column bus CB1 to a selected processing element or elements in the first column of the processing element array, and the output from AND gate 146 may be used for outputting the information by being fed to the input-output means 40. Thus, by selectively enabling the AND gates 144, 145, or 146 it may be seen that information from an input-output means may be routed to a selected processing element or elements in the first row, or a selected processing element or elements in the first column. Additionally, information from any of the processing elements in the first row may be fed to other processing elements of the first row, or alternatively to any processing element in the first column as will become apparent hereinafter. In a similar manner OR gate 132 is operable to receive information from any of the processing elements 2 or 6 or 10 or 14 of the second row via row bus RB2 and may also accept information from the processing elements 5 or 6 or 7 or 8 of the second column via column bus CB2. The OR gate 132 in addition, receives information from an input-output means 40 via the input line 170 and is operable to set or reset the flip-flop 122 in accordance with the information appearing at the inputs of the OR gate 132. The output signal provided by the flip-flop 122 is fed to AND gates 150, 151 and 152 each receiving a respective control signal CA, CB and CC. By proper selection of these signals the information provided by the flip-flop 122 may be routed to selected processing elements in the second row of the array by means of the AND gate 150 and the row bus RB2. Information may be fed to the selected processing elements of the second column by means of the AND gate 151 transmitting information via the column bus CB2, or the information may be fed to input-output equipment by means of the AND gate 152. In a similar manner, the OR gate 136 is operable to receive information from a processing element in the third row via row bus RB3, from a processing element in the third column via column bus CB3, or from input-output equipment via the input line 172. The flip-flop 124 will be set in accordance with the information appearing at the OR gate 136 and the output of flip-flop 124 is fed to the AND gates 157, 158 and 159 each receiving a respective control signal CA, CB and CC. The AND gate 157 is operable to transfer information to selected processing elements in the third row via the row bus RB3, the AND gate 158 is operable to transfer information to selected processing elements of the third column via the column bus CB3, and the AND gate 159 is operable to transfer the information to input-output equipment 40. OR gate 140 receives information from a processing element in the fourth row, via the row bus RB4, information from a processing element in the fourth column via the column bus CB4, and information from the input-output means 40 via the input line 174. Flip-flop 126 is accordingly set or reset in accordance with the information appearing at the OR gate 140 and the AND gate 162, 163, and 164 receive the output signal from the flip-flop 126. In a similar manner with the CA signal to AND gate 162 energized, information will be transferred to selected processing elements in the fourth row via the row bus RB4, with the CB signal to AND gate 163 energized information will be transferred to selected processing elements in the fourth column via the column bus CB4, and with the CC signal to AND gate 164 the information appearing at the flip-flop 126 will be fed to the input-output equipment.

For a better understanding of the operation of external control means 15 of the present invention, used in conjunction with a transfer of information amongst the processing elements, a situation will be considered wherein each of the processing elements of the array shown in FIGURE 1 contain information and it is desired to transfer the information located in the processing elements of the first row to the processing elements of the first column, and in a similar manner to transfer the information in the second row of processing elements to the processing elements of the second column, and which process is continued until the information located in all the rows will be transferred to all the columns and vice versa. This type of operation is encountered in many determinant calculations and matrix multiplication problems. By providing the M1, M2, M3 and M4 signals to each processing element, the STROKE gates 76, 77, 78 and 79 (FIG. 9) of each processing element results in at least one of these processing elements being enabled. A first selection signal is provided by the first signal providing means 16 of the external control means 15, on line 20 such that processing elements 1, 5, 9 and 13 receive an R signal. The second signal providing means 18 of the external control means 15 provides a second selection signal along lines 24, 25, 26 and 27 such that each processing element in the array receives a C signal, however, it may be seen that only the processing elements of the first row receive both an R and a C signal such that the enabling signal will be provided in these processing elements. With the enabling signal thus provided the CCO signal to AND gate 108 (FIG. 10) of each of the processing elements 1, 5, 9 and 13 is made a ONE such that the first bit of information contained within the processing element may be transferred, via the AND gate 108 to an associated column bus, and it may be seen that processing element 1 will transfer information to column bus CB1, processing element 5 will transfer information to column bus CB2, processing element 9 will transfer information to column bus CB3, and processing element 13 will transfer information to column bus CB4. The flip-flops 120, 122, 124 and 126 of the buffer means 30 (FIG. 11) will thereby be set in accordance with the bit of information received. At this time first selection signals are provided via the lines 20, 21, 22 and 23 such that each of the processing elements including 1, 2, 3 and 4 receive an R signal, and a second selection signal is provided along line 24 so that each of these latter processing elements receive a C signal and at this point each of the processing elements 1, 2, 3 and 4 will provide an enabling EN signal. The CA signal to AND gates 144, 150, 157 and 162 are made ONES thereby enabling these AND gates such that the information provided by the flip-flops in the buffer means 30 will be transferred via the row bus RB1 to processing element 1, via the row bus RB2 to processing element 2, via the row bus RB3 to the processing element 3, and via the row bus RB4 to processing element 4. The STROKE gate 114 of each of the processing elements in the first column receives the enabling signal EN and at this point, the CRI signal from the central control means 10 is made a ONE such that the information appearing on the row buses may enter each processing element of the first column. With the processing elements of the first column having an enabling EN signal provided, information may then be transferred to each of the associated row buses by making the CRO signal to AND gate 110 a ONE to thereby cause setting of the flip-flops of the buffer means 30 in accordance with the information located in the processing elements of the first column. By again providing the C signal along lines 24, 25, 26 and 27 in addition to the R signal along line 20, the processing elements of the first row will be enabled. With the enabling EN signal provided in the processing elements of the first row, the CCI signal to STROKE gate 112 is made a ONE such that the information appearing on the column buses may enter the associated processing element. That is, by making the CB signal to AND gates 145, 151, 158 and 163 a ONE (FIG. 11), information may be transmitted along the column bus CB1 to the processing element 1, along the column bus CB2 to processing element 5, along the column bus CB3 to processing element 9, and along column bus CB4 to processing element 13 thus effecting a transfer of information from the first row to the first column, and from the first column to the first row. If more than one bit of information is to be transmitted, this process may be continued until all of the information located in the processing elements of the first row are transferred to the processing elements of the first column and vice versa. In a similar fashion, by providing an R signal along line 21 to processing elements 2, 6, 10 and 14, and a C signal along lines 24, 25, 26, and 27, the processing elements of the second row of the array will be enabled and may transfer information to the buffer means 30 along the column buses. By then providing the R signals along lines 20, 21, 22 and 23 in addition to a C signal along line 25, each of the processing elements 5, 6, 7 and 8 of the second column will be enabled to receive the information from the buffer means 30 via the row buses. At this point information may be transferred out of the processing element of the second column to the buffer means 30 and by providing the R signal along line 21 and the C signal along lines 24, 25, 26 and 27 once again, information may be transferred to the processing elements of the second row thus effecting a transfer of information from the processing elements of the second row to the processing elements of the second column and vice versa. This general scheme may be carried out until information located in the last row of processing elements is transferred to the processing elements of the last column, and vice versa. It may be seen that although each of the processing elements in the array receive the identical control signals from the central control unit 10, and each of the processing elements in a row receive the signal appearing on a row bus, in addition to each processing element in a column receiving the information in a column bus, only those processing elements in which an enabling EN signal has been provided by virtue of the external control means 15, will accept or transfer information. Information from input means may be transferred to selected processing elements of the array by bringing in the information along lines 168, 170, 172 and 174 (FIG. 11) setting the flip-flops 120, 122, 124 and 126 accordingly and by providing the CA or CB signals to the AND gates receiving the output of the flip-flops. To transfer information from selected processing elements to input-output means 40 the CC signal to AND gates 146, 152, 159 and 164 may be made a ONE to thereby enable these gates to transfer the information set into the flip-flops 120, 122, 124 and 126 to the input-output equipment 40. By proper choice of the first and second selection signals provided by the external control means 15, information in selected processing elements may be transferred to other processing elements in the array in a manner other than an interchange of row and column information.

In addition to simplifying and speeding up data transfer operations, the external control means of the present invention adds great flexibility to the parallel network type computer in many computational operations. In a parallel network type computer having the capability to operate in a plurality of modes, as demonstrated with respect to FIGURE 9, the provision of the external control means 15 allows such a computer system to effectively increase the number of modes of operation in that even if a particular processing element receives a mode indicating signal, and the coding means is providing an output signal indicating that particular mode, the enabling EN signal will not be provided in the absence of the first and second selection signals R and C. Thus, by choosing predetermined first and second selection signals, various processing elements may be made non-responsive to the control signals, an operation particularly useful in setting up boundary conditions in the solution of problems. In addition, the external control means affords the parallel network type computer the capability of having subsets of processing elements calculate, or operate on different portions of a particular problem or even different problems. This advantage may be realized even in parallel network type computer systems lacking the capabilities to be in a plurality of modes.

Figure 12:
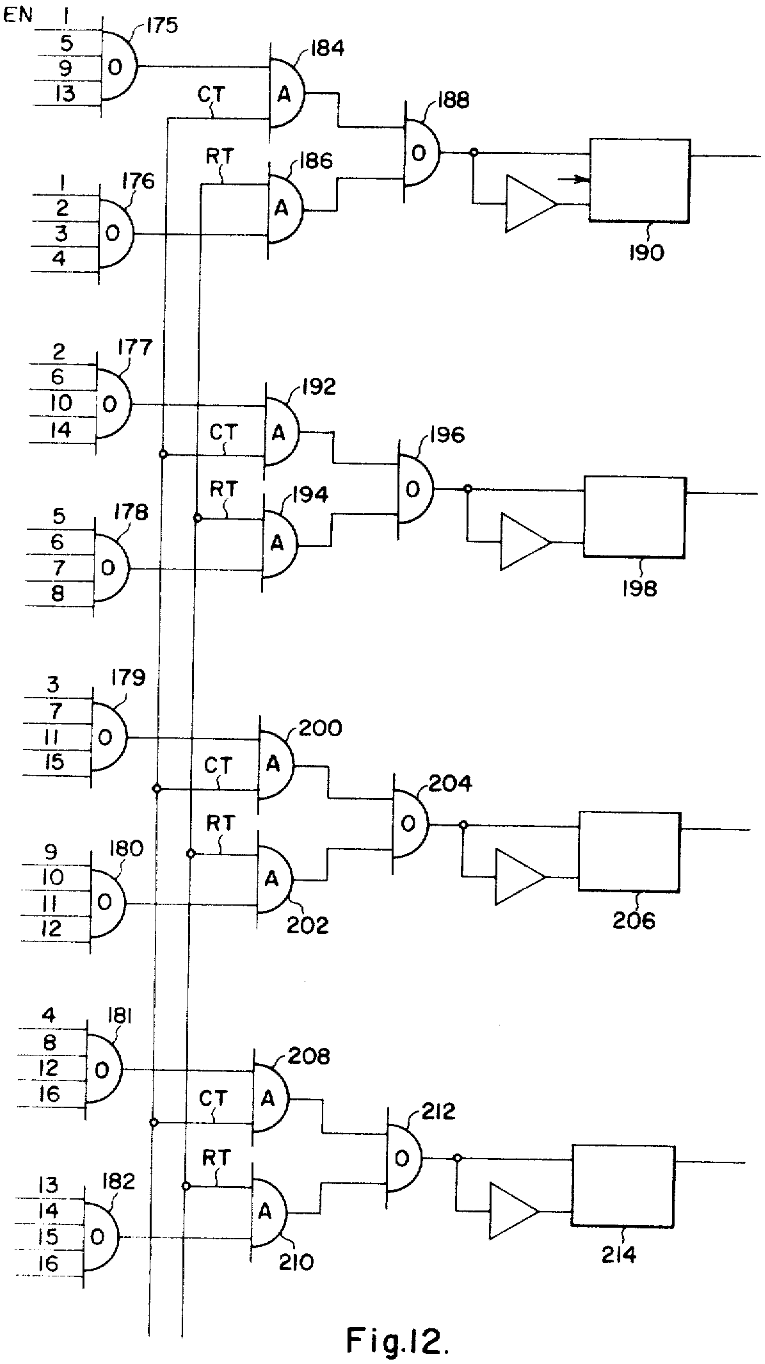
FIG. 12 illustrates circuit means for determining whether certain processing elements have carried out certain instructions.

In many instances it is desired to know whether a particular processing element supplied with both a first and second selection signal has provided an enabling EN signal. This information may be utilized in a number of ways such as the determination of the proper operation of the processing elements, to provide signals to create a "map" of operating processing elements, or to determine whether processing elements have transmitted "legitimate" ZEROS in a transfer operation, to name a few. Accordingly, there is provided circuit means responsive to any enabling EN signal provided within each processing element to provide output signals indicative of the fact that an enabling signal has been produced. Basically this circuit means could comprise a plurality of flip-flop devices, with each flip-flop device being responsive to an enabling signal of an individual processing element, however, in a parallel network type system having over one thousand individual processing elements, the cost and size of such circuitry would be extremely large. To this end, FIGURE 12 illustrates circuitry means for indicating whether or not an enabling signal has been provided by the individual processing elements of a parallel network type computer and uses a minimal number of flip-flop devices. For the 4×4 array of processing elements shown in FIGURE 1, there is provided in the circuitry of FIGURE 12 a plurality of OR gates 175 to 182 with each OR gate capable of receiving an enabling signal from a different group of processing elements of the entire array. By way of illustration OR gate 175 is capable of receiving any enabling signal from the processing elements of the first row, namely, processing elements 1, 5, 9 or 13. OR gate 176 is capable of receiving any enabling signals from the processing elements of the first column, namely processing elements 1, 2, 3 and 4. Otherwise stated, OR gate 175 is capable of receiving any enabling signal from the first processing elements of each column, and OR gate 176 is capable of receiving any enabling signals from the first processing elements of each row. Any output signal produced by OR gate 175 is received by AND gate 184, and any signal produced by OR gate 176 is received by AND gate 186. Since OR gate 175 receives enabling signals from the first processing elements of each column in the processing element array, AND gate 184 is utilized to determine if any enabling signal from these processing elements have been provided and to accomplish this test AND gate 184 receives a column test signal CT. OR gate 176 receives enabling signals from the first processing elements of each row and in a similar fashion AND gate 186 receives a row test signal RT. OR gate 188 is responsive to any signal which may be provided by AND gate 184 or 186 to set or reset the flip-flop 190 thereby indicating the presence of an enabling signal. By way of example, if it is desired to test whether any of the processing elements of the first row have had an enabling signal provided, the column test signal CT to AND gate 184 is made a ONE, that is, the first processing element in each of the columns is being tested. If any of the enabling signals EN 1, 5, 9 or 13 (from processing elements 1, 5, 9 or 13) are present, AND gate 184 will provide a ONE signal to OR gate 188 which will then place the flip-flop 190 into a set condition. If it is desired to test whether an enabling signal has been provided in any of the processing elements of the first column, that is, the first processing element of each row, the row test signal RT to AND gate 186 is made a ONE and if any of these latter enabling signals are present AND gate 186 will provide a ONE output signal which causes OR gate 188 to place the flip-flop 190 into a set state of operation. In a similar manner, OR gate 177 is capable of receiving any enabling signal from the second row of processing elements, that is the second processing element in each column, namely processing elements 2, 6, 10 and 14 and OR gate 178 is capable of receiving any enabling signal produced by the processing elements in the second column, that is, the second processing element in each row, namely, processing elements 5, 6, 7 and 8. A column test CT signal to AND gate 192 will determine if any enabling signal has been provided in the second processing element of each column and a row test signal RT to AND gate 194 will determine if any enabling signal has been provided to the second processing element in each row. OR gate 196 is responsive to any signal produced by either the AND gate 192 or 194 to set the flip-flop 198 accordingly. OR gate 179 is capable of receiving any enabling signal provided by the third row of processing elements that is the third processing element in each column, namely, processing elements 3, 7, 11 and 15, and OR gate 180 is capable of receiving any enabling signals from the third column, that is the third processing element in each row, namely, processing elements 9, 10, 11 and 12. AND gate 200 receives a column test CT signal and AND gate 202 receives a row test RT signal the results of the test being received by OR gate 204 to set or reset the flip-flop 206 accordingly. The general scheme of gating arrangements is provided for an entire array, and in the present example the last set of OR gates 181 and 182 receive respectively any enabling signals from the last processing element in each column and the last processing element in each row. AND gates 208 or 210 receiving a column test CT signal and a row test RT signal respectively, provide an output signal to OR gate 212 to set or reset flip-flop 214 accordingly.

To more fully demonstrate the operation of the circuit of FIGURE 12, consider by way of example, and with specific reference to FIGURE 1, the situation wherein a C signal is provided along line 25 to each of the processing elements in the second column, and an R signal is provided along lines 20, 21, 22 and 23. The processing elements of the second column that is, the second processing element in each row are then capable of providing an enabling EN signal depending upon conditions internal to the processing elements. Suppose further that it is desired to transmit the information from the processing elements of the second column to the buffer means 30 and that for some reason the enabling EN signal in processing element 8 has not been provided. This absence of an enabling signal may be due to a malfunction in processing element 8 or if the computer has the capabilities of operating in a plurality of modes, processing element 8 may be in a non-addressed mode. When the transfer of information has taken place to the buffer means 30 as was heretofore described, the flip-flop 126 (FIG. 11) will provide a ZERO output signal (since OR gate 149 receives a ZERO signal from the routing AND gate 110) and it is not known whether this ZERO signal was the information contained in processing element 8 or this ZERO was due to the fact that there was no enabling signal produced in processing element 8. The circuitry of FIGURE 12 therefore is operable to ascertain whether or not a legitimate ZERO has been produced and functions in the following manner. A column test will be made and the CT signals to AND gate 184, 192, 200 and 208 will be made a ONE thereby enabling these latter AND gates. Since a column test is being made, the row test signal RT to AND gates 186, 194, 202 and 210 remain ZEROS and the output signals from these latter AND gates will remain ZEROS. Since an enabling EN signal is provided in processing element 5, OR gate 175 will receive this signal thereby providing a ONE output signal to AND gate 184 which in turn provides a ONE output signal to OR gate 188 causing the flip-flop 190 to be placed into a set state of operation. The enabling EN signal produced by processing elements 6 is received by OR gate 177 to cause the AND gate 192 to provide a ONE output signal to OR gate 196 which places the flip-flop 198 into a set state of operation. The enabling signal provided by processing elements 7 is received by OR gate 179 which causes the AND gate 200 to provide a ONE output signal to OR gate 204 causing the flip-flop 206 to be put in a set state of operation. Recalling that no enabling signal was provided in the processing element 8, OR gate 181 therefore receives all ZERO input signals thereby providing a ZERO output signal to AND gate 208 and since AND gates 208 and 210 provide ZERO signals to OR gate 212, flip-flop 214 will not be placed into a set state of operation thereby indicating that the last processing element in the column, that is processing element 8, has not produced an enabling signal EN and therefore the ZERO output signal provided by flip-flop 126 of the buffer means 30 (FIG. 11) does not represent transmitted data. The conditions of the flip-flops 190, 198 206 and 214 in this instance represent only that an enabling signal has been provided in the processing elements under examination and any ONE output signals provided by these flip-flops in a set state of operation do not actually represent data transmitted but only the fact that data has been transmitted.

Accordingly, there has been provided external control means for a parallel network type computer having a plurality of processing elements each receiving identical control signals from a central control means to carry out operations specified by the control signals. The external control means, by proper provision selection signals to the processing elements of the computer, functions to increase the speed of input and output, as well as data transfer operations. In addition, great flexibility is afforded the parallel network type computer with the external control means by allowing the processing of small independent problems and allowing the selection of a single processing element, or groups of processing elements to carry out predetermined operations.

Although the present invention has been described with a certain degree of particularity, it should be understood that the present disclosure has been made by way of example and that modifications and variations of the present invention are made possible in the above teachings.

We claim as our invention:

1. A computer comprising:
(1) central control means;
(2) an array of processing elements for receiving control signals from said central control means to carry out commands specified by said control signals;
(3) each said processing element including,
(a) memory means for storing data,
(b) means for carrying out predetermined operations on said data,
(c) routing means for transferring said data to other selected processing elements of said array, and
(d) internal control means operable in response to predetermined signals for providing an enabling signal;
(4) external control means for supplying first and second selection signals to each processing element of said array and
(5) said internal control means responsive to said first and second selection signals so that when present, said enabling signal will be provided.

2. A computer comprising:
(1) central control means;
(2) an array of processing elements for receiving control signals from said central control means to carry out commands specified by said control signals;
(3) each said processing element including,
(a) memory means for storing data,
(b) means for carrying out predetermined operations on said data,
(c) routing means for transferring said data to other selected processing elements of said array, and
(d) internal control means operable in response to predetermined control signals for providing an enabling signal;
(4) external control means for supplying first and second selection signals to each processing element of said array and
(5) said internal control means responsive to said predetermined control signals and said first and second selection signals to provide said enabling signal only when all are present.

3. A computer comprising:
(1) central control means;
(2) a plurality of processing elements for receiving control signals from said central control means to carry out commands specified by said control signals;
(3) each processing element including,
(a) memory means for storing data,
(b) means for carrying out predetermined operations on said data,
(c) routing means for transferring data into and out of said processing element,
(d) coding means for providing signals indicative of a particular mode of operation of the processing element;
(4) external control means for providing at least a first and second selection signal to preselected processing elements;
(5) decoding means associated with each said processing element;
(6) said decoding means responsive to predetermined mode indicating signals from said central control means, said signals provided by said coding means and said first and second selection signals for providing an enabling signal to allow the processing element to carry out said commands.

4. In a computer having a plurality of processing elements receiving identical control signals from a central control means for performing desired operations on data stored in memory means associated with each processing element, the improvement comprising:
(1) first signal providing means for selectively supplying a first selection signal to a predetermined plurality of processing elements;
(2) second signal providing means for selectively supplying a second selection signal to a predetermined plurality of processing elements;
(3) each said processing element operable to perform said operations if supplied with said first and second selection signals.

5. In a computer having a plurality of processing elements receiving identical control signals from a central control means for performing desired operations on data stored in memory means associated with each processing element, the improvement comprising:
(1) first signal providing means for selectively supplying a first selection signal to a predetermined plurality of processing elements;
(2) second signal providing means for selectively supplying a second selection signal to a predetermined plurality of processing elements;
(3) each said processing element operable to be nonresponsive to said control signals, in the absence of said first and second selection signals.

6. In a computer having a plurality of processing elements receiving identical control signals from a central control means for performing desired operations on data stored in memory means associated with each processing element, the improvement comprising:
(1) first signal providing means for selectively supplying a first selection signal to a predetermined plurality of processing elements;
(2) second signal providing means for selectively supplying a second selection signal to a predetermined plurality of processing elements;

(3) each said processing element operable to perform said operations in response to a predetermined combination of said first and second selection signals.

7. A computer comprising:

(1) a central control means for providing a plurality of control signals;

(2) a plurality of processing elements arranged in an $n \times m$ array with each processing element including memory means, logic and arithmetic means and internal control means for carrying out operations specified by said control signals;

(3) first signal providing means operable to supply $n$ selection signals to said array;

(4) second signal providing means operable to supply $m$ selection signals to said array;

(5) means associated with each said processing element and responsive to at least one of said $n$ or $m$ selection signals for providing an enabling signal to to allow said processing element to carry out said operations.

8. A computer comprising:

(1) a central control means for providing a plurality of control signals;

(2) a plurality of processing elements arranged in an $n \times m$ array with each processing element including memory means, logic and arithmetic means and internal control means for carrying out operations specified by said control signals;

(3) first signal providing means operable to supply $n$ selection signals to said array;

(4) second signal providing means operable to supply $m$ selection signals to said array;

(5) means associated with each processing element operable to receive both said $n$ and $m$ signals for providing an enabling signal only when both said $n$ and $m$ selection signals are present.

9. A computer as in claim 8 wherein $n=m$.

10. In a computer system having an array of processing elements each including memory means, logic and arithmetic means, internal control means and means for transferring data into and out of the processing element, for carrying out operations specified by a central control means, the improvement comprising:

(1) first signal providing means for supplying a plurality of first selection signals to a first plurality of groups of processing elements of said array;

(2) second signal providing means for supplying a plurality of second selection signals to a second plurality of groups of processing elements of said array;

(3) buffer means operably connected to each of said first and second plurality of groups for receiving and transmitting data only from and to processing elements of said array which are supplied with both a first and second selection signal.

11. A computer comprising:

(1) a central control means for providing a plurality of control signals;

(2) an array of processing elements arranged into $n$ rows and $m$ columns with each processing element including memory means for storing data, logic and arithmetic means, and internal control means for carrying out operations specified by said control signals;

(3) buffer means including a plurality of storage devices;

(4) communicating means connecting a first row of processing elements to a first said storage device;

(5) means connecting successive rows of processing elements to successive storage devices;

(6) means connecting a first column of processing elements to said first storage device;

(7) means connecting successive columns of processing elements to successive storage devices; and (8) input-output means operably connected with said buffer means for transferring information to and from said buffer means.

12. A computer comprising:

(1) a central control means for providing a plurality of control signals;

(2) an array of processing elements arranged into $n$ rows and $m$ columns with each processing element including memory means for storing data; and internal control means for carrying out operations specified by said control signals;

(3) external control means for providing a plurality of first and second selection signals;

(4) means associated with each said processing element for providing an enabling signal when supplied with both a first and second selection signal;

(5) buffer means including a plurality of storage devices;

(6) communicating means connecting a first row of processing elements to a first said storage device;

(7) means connecting successive row of processing elements to successive storage devices;

(8) means connecting a first column of processing elements to said first storage device;

(9) means connecting successive columns of processing elements to successive storage devices;

(10) gating means associated with each said processing element responsive to predetermined control signals from said central control means and said enabling signal, when present, to transfer data from the processing element to a selected communicating means, and

(11) input-output means operably connected with said buffer means for transferring information to and from said buffer means.

13. In a computer having a plurality of processing elements receiving control signals from a central means for performing desired operations on data stored in memory means associated with each processing element, the improvement comprising:

(1) external signal providing means for selectively supplying a selection signal to a predetermined plurality of processing elements;

(2) means associated with each said processing element for providing an enabling signal only in response to said selection signal for allowing the performance of said desired operations.

14. A computer comprising:

(1) central control means;

(2) an array of processing elements for receiving control signals from said central control means to carry out commands specified by said control signals;

(3) each said processing element including, (a) memory means for storing data, (b) means for carrying out predetermined operations on said data, (c) routing means for transferring said data to other selected processing elements of said array, and (d) internal control means operable in response to predetermined control signals for providing an enabling signal;

(4) external control means for supplying at least a first selection signal to a predetermined number of processing elements of said array;

(5) said internal control means responsive to said first selection signal so that when present, said enabling signal will be provided.

15. A computer comprising:

(1) central control means for providing a plurality of control signals;

(2) a plurality of processing elements arranged in an $n \times m$ array with each processing element including memory means, logic and arithmetic means and internal control means for carrying out operations specified by said control signals;

(3) signal providing means operable to supply a selection signal to predetermined processing elements of said array and;

(4) means associated with each said processing element responsive to said selection signal for providing an enabling signal to allow said processing element to carry out said operations.

References Cited by the Examiner

UNITED STATES PATENTS 3,229,260 1/1966 Falkoff ----------- 340—172.5

ROBERT C. BAILEY, *Primary Examiner.*

M. LISS, *Assistant Examiner.*